Nov. 19, 1935.  W. C. MAST  2,021,372
PURIFICATION OF GASES FROM DECOMPOSITION OF ACID SLUDGE
Filed Dec. 1, 1933
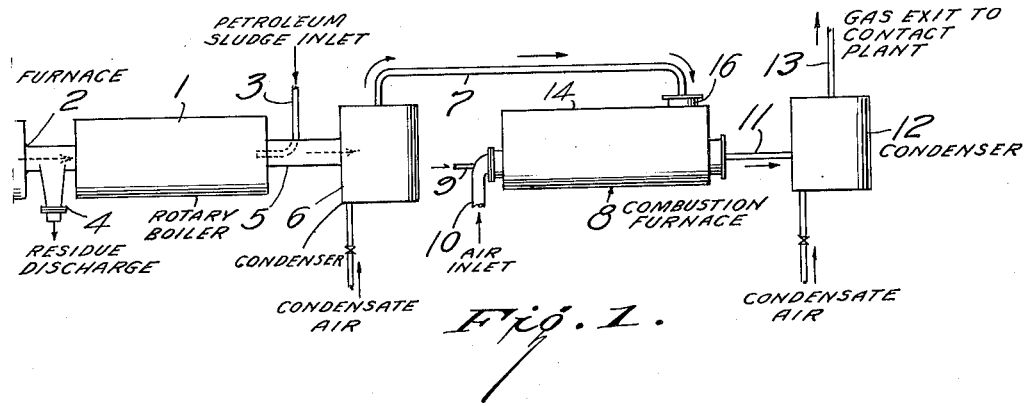
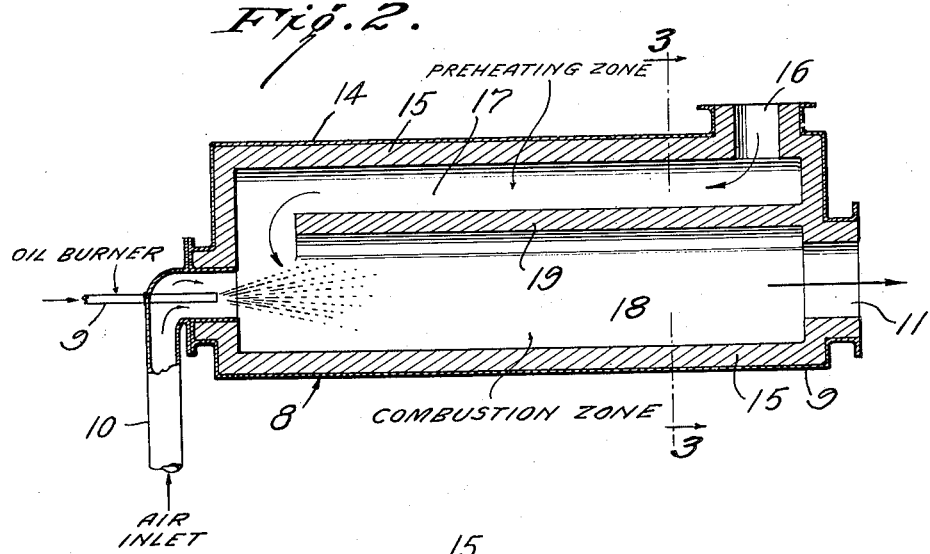
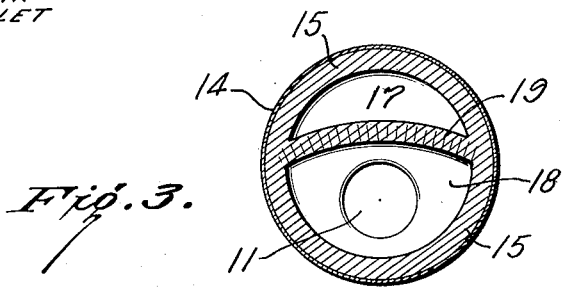
INVENTOR.
WILLIAM C. MAST,
BY
Robert Ames Norton
ATTORNEY.

Patented Nov. 19, 1935

2,021,372

UNITED STATES PATENT OFFICE 2,021,372

PURIFICATION OF GASES FROM DECOMPOSITION OF ACID SLUDGE

William C. Mast, Karns City, Pa., assignor to Chemical Construction Corporation, New York, N. Y., a corporation of Delaware Application December 1, 1933, Serial No. 700,438

5 Claims. (Cl. 23—178)

This invention relates to the production of sulphuric acid from the acid sludge from the sulphuric acid purification of carbonaceous material and more particularly the invention relates to steps in the purification of the $SO_2$ gas obtained by decomposition of the sludge.

Acid sludge from the sulphuric acid purification of carbonaceous materials and particularly petroleum fractions has constituted a serious problem because it is very difficult to utilize this sludge for any useful purpose. Numerous attempts to decompose the sludge with the formation of an $SO_2$ containing gas which could then be oxidized to $SO_3$ for the production of sulphuric acid have been unsuccessful. Finally the problem was solved by the Hechenbleikner process described in the application of I. Hechenbleikner, Serial No. 568,050, filed October 10, 1931, now Patent No. 1,953,225, dated April 3, 1934. In this process the acid sludge is subjected to a continuous treatment in zones of increasing temperature, particularly by the use of an internally fired rotary kiln. The gas obtained with the Hechenbleikner process is free from hydrogen sulphide and the process operates smoothly and economically with suitable sludges. However, the $SO_2$ gas produced, besides containing water and inert gases, contains hydrocarbons some of which are not condensed in ordinary condensers. The presence of hydrocarbons in the gas stream, of course, renders it unsuitable for the production of sulphuric acid in the ordinary contact plant because the hydrogen of the hydrocarbons on combustion in the sulphuric acid converter is transformed into water with the resulting nuisance of sulphuric acid mist formation and serious corrosion problems in the contact apparatus. The difficulties encountered by the presence of hydrocarbons in the $SO_2$ gas necessitated removal of the hydrocarbons which is most simply effected by burning them. This process generally is described and claimed in the application of Hechenbleikner and Mast Serial No. 693,136, filed October 11, 1933.

The Hechenbleikner and Mast process is suitable for sludges which are relatively low in oil and which, therefore, produce an $SO_2$ gas containing only a moderate amount of hydrocarbons. The process however is rather limited in its application to sludges of greater oil content because the dilution which results from the combustion of hydrocarbons soon lowers the concentration of $SO_2$ below the economically efficient point for the contact sulphuric acid process. In the Hechenbleikner and Mast process the hydrocarbon gases are burned by introducing them into an ordinary combustion furnace in which an oil burner is burning, the gases mixing with the flame and being brought up to combustion temperature. Because of the relatively low hydrocarbon content it is necessary to use a considerable amount of fuel in order to be sure that the flame temperature is sufficiently high to assure complete combustion. This still further increases the dilution and limits the oil content of sludges which may be employed. It also results in an exit gas of higher temperature which requires more cooling in subsequent condensers and, therefore, increases the water consumption.

According to the present invention the amount of fuel required in the Hechenbleikner and Mast process is very markedly decreased and a very efficient design of combustion furnace is obtained. The present invention depends on the preheating of the hydrocarbon containing gases by the heat of combustion to a high temperature before the contact with the oil flame. At the high temperature they burn readily and require a much smaller consumption of fuel in the burner in order to obtain adequate ignition temperature. This reduces the dilution because every pound of fuel burned requires nearly four pounds of oxygen and hence about twenty pounds of air. At the same time a large portion of the heat of combustion is utilized in preheating the gases so that the gas exit temperature from the furnace is lower and, therefore, the subsequent condensing problem is simplified and the amount of water used is decreased. This permits the utilization of the invention with sludges of higher oil content and even with sludges of sufficiently low oil content to be satisfactorily utilized in the ordinary Hechenbleikner and Mast process the enhanced efficiency of the combustion furnace decreases fuel and water costs and renders the process more satisfactory and economical.

The invention will be described in greater detail in conjunction with the drawing in which:

Fig. 1 is a diagrammatic layout showing the relationship of the combustion furnace to the rotary kiln where the gases to be purified are evolved.

Fig. 2 is a sectional view through a combustion furnace.

Fig. 3 is a sectional view along the line 3—3 of Fig. 2.

Referring now to the particular embodiment illustrated, the kiln is shown at 1, rotated by any suitable means and fired at one end by means of a furnace 2 which supplies the necessary heat for the petroleum sludge treatment. The sludge in question enters through the pipe line 3, passes through the furnace in a direction countercurrent to the in-flowing combustion gases and the residue from this heat treatment is discharged at 4.

The gaseous products of the reaction with whatever entrained solid material may be in it, pass through the take-off 5 and preferably into a condenser 6 where any moisture or other condensable material is removed in the usual manner. The remaining gases pass through the pipe line 7 and into the combustion furnace 8 where the combustible content of the gases are burned as by the fuel burner 9 in the presence of additional air added through the inlet 10 and the products of combustion and the thus purified gases pass through the outlet 11 into any suitable further purification equipment such as a condenser 12 and from there through the pipe 13 to the sulphur acid converter (not shown). There the $SO_2$ content is converted into $SO_3$ and subsequently recovered.

For the details of the combustion furnace, reference is made to Fig. 2. There the furnace in question may consist of a metal shell 14 lined with firebrick or the like 5 and divided as by the wall 19 into two compartments, compartment 17 constituting a preheating zone and compartment 18 a combustion zone.

At one end of the furnace a burner 9 is provided which projects its flame and the products of combustion thereof into the zone 18, additional air being supplied through the inlet 10.

In operation the kiln gases from the petroleum sludge heat treatment step enter through the inlet 16 and pass in heat exchange relationship with the combustible material in zone 18. This preheated gaseous material then enters the combustion zone 18 where its combustible content is burned and the products of combustion together with the $SO_2$ content pass through the outlet 11 to a suitable apparatus, which includes a catalytic converter.

While the simple type of combustion furnace and preheater shown in the drawings is satisfactory for most installations it is sometimes desirable to increase the preheating efficiency of the furnace and this may be effected by any suitable means such as by baffling the flame or by providing the preheating chamber wall with fins or other means for increasing the effective surface. Such structural details are, of course, not shown in the drawing which is simplified in order to illustrate the principle of the invention, it being understood, of course, that any suitable structural modifications which are desirable in a specific installation will be included by the skilled engineer.

What I claim is:

1. A method of producing $SO_3$ from acid sludge from the sulphuric acid purification of carbonaceous materials, which comprises subjecting the sludge to thermal decomposition with the production of a gas containing $SO_2$, water and hydrocarbons, condensing out water and condensable hydrocarbons, introducing air sufficient for combustion of the hydrocarbons, burning them in a furnace with sufficient additional fuel to maintain ignition temperature, causing the gases entering the furnace to pass in heat exchanging relation, but out of direct contact with the combustion gases, said heat exchange being such that the incoming gases are preheated and the combustion gases are cooled, subjecting the combustion gases to condensation of water vapor and converting the gases thus purified in a sulphuric acid converter.

2. A method according to claim 1 in which the $SO_2$ gas contains an amount of uncondensable hydrocarbons in excess of the amount which can be burned without preheating and without producing a gas too dilute for use in the contact sulphuric acid process.

3. A method of producing $SO_3$ from acid sludge from the sulphuric acid purification of carbonaceous materials, which comprises subjecting the sludge to thermal decomposition by direct contact with combustion gases under conditions producing an $SO_2$ gas containing hydrocarbons, subjecting the gas to condensation of water vapor and condensable hydrocarbons, admixing air and burning the hydrocarbon content of the gas in a furnace provided with a fuel burner to maintain ignition temperature, the $SO_2$ gas before contacting with the flame being passed in heat exchanging relation, but out of direct contact with the combustion gases, said heat exchange being such that the $SO_2$ gases are preheated and the combustion gases are cooled, subjecting the combustion gases to condensation of water vapor formed and converting the gases thus purified in a sulphuric acid converter.

4. A method according to claim 3 in which the $SO_2$ gas contains an amount of uncondensable hydrocarbons in excess of the amount which can be burned without preheating and without producing a gas too dilute for use in the contact sulphuric acid process.

5. An apparatus for producing an $SO_2$ gas free from hydrocarbons, which comprises in combination a sludge decomposition kiln and means for heating the same, a gas take-off therefrom, a condensing means for water and condensable hydrocarbons, means connecting the gas take-off with the condenser, a combustion furnace comprising two chambers with a common wall, one of said chambers being connected with the outlet of the condenser and the other chamber being provided with a burner for maintaining ignition temperature, the two chambers being connected together at one end and the combustion chamber being provided with a gas exit at the opposite end.

WILLIAM C. MAST.